United States Patent
Wang et al.

(10) Patent No.: US 7,127,487 B1
(45) Date of Patent: Oct. 24, 2006

(54) SYSTEM AND METHOD FOR SIDEBAR FUNCTIONALITY IN A REGULAR CONFERENCE SYSTEM

(75) Inventors: Guanglu Wang, Buffalo Grove, IL (US); Michael D. Homeier, Elmhurst, IL (US)

(73) Assignee: 3Com Corporation, Marlborough, MA (US)

( * ) Notice: Subject to any disclaimer, the term of this patent is extended or adjusted under 35 U.S.C. 154(b) by 659 days.

(21) Appl. No.: 09/977,832

(22) Filed: Oct. 15, 2001

(51) Int. Cl.
*G06F 15/16* (2006.01)
*G06F 13/00* (2006.01)
*H04L 12/66* (2006.01)
*H04L 12/28* (2006.01)

(52) U.S. Cl. ............... 709/204; 709/248; 709/205; 709/206

(58) Field of Classification Search ........ 709/204–206, 709/217, 227, 327–329, 248; 719/329; 370/260, 352, 401; 379/88.17, 265, 202, 379/201, 96, 112
See application file for complete search history.

(56) References Cited

U.S. PATENT DOCUMENTS

| | | | |
|---|---|---|---|
| 4,870,408 A | 9/1989 | Zdunek et al. | |
| 5,426,510 A * | 6/1995 | Meredith | 386/107 |
| 5,442,809 A | 8/1995 | Diaz et al. | |
| 5,533,110 A * | 7/1996 | Pinard et al. | 379/355.01 |
| 5,568,511 A | 10/1996 | Lampe | |
| 5,710,591 A | 1/1998 | Bruno et al. | |
| 5,818,836 A | 10/1998 | DuVal | |
| 5,850,611 A | 12/1998 | Krebs | |
| 5,884,196 A | 3/1999 | Lekven et al. | |
| 5,936,964 A | 8/1999 | Valko et al. | |
| 5,983,099 A | 11/1999 | Yao et al. | |
| 6,014,556 A | 1/2000 | Bhatia et al. | |
| 6,032,051 A | 2/2000 | Hall et al. | |
| 6,041,241 A | 3/2000 | Willey | |
| 6,119,017 A | 9/2000 | Cassidy et al. | |
| 6,178,323 B1 | 1/2001 | Nagata | |
| 6,236,854 B1 | 5/2001 | Bradshaw, Jr. | |
| 6,363,411 B1 * | 3/2002 | Dugan et al. | 709/202 |
| 6,381,467 B1 | 4/2002 | Hill et al. | |
| 6,404,873 B1 * | 6/2002 | Beyda et al. | 379/202.01 |
| 6,417,933 B1 | 7/2002 | Szurkowski | |
| 6,490,452 B1 | 12/2002 | Boscovic et al. | |
| 6,526,377 B1 | 2/2003 | Bubb | |
| 6,577,721 B1 | 6/2003 | Vainio et al. | |
| 6,622,016 B1 * | 9/2003 | Sladek et al. | 455/414.1 |

(Continued)

FOREIGN PATENT DOCUMENTS

EP    0 817 457    1/1998

(Continued)

OTHER PUBLICATIONS

International Search Report from International Application No. PCT/US02/31411, dated Mar. 4, 2003.

(Continued)

*Primary Examiner*—Jeffrey Pwu
*Assistant Examiner*—Jude J. Jean-Gilles
(74) *Attorney, Agent, or Firm*—Richard A. Baker, Jr.

(57) ABSTRACT

A system and method for establishing a conference between a first user and a second user. The first user has an audio stream. The second user has an audio stream. The conference has an audio stream. A temporary conference is created. The audio stream of the conference is directed to the sidebar conference. The audio stream of the first user is directed to the temporary conference and the audio stream of the second user is directed to the temporary conference. The audio stream of first user and the audio stream of the second user are only audible to the first user and the second user.

13 Claims, 4 Drawing Sheets

U.S. PATENT DOCUMENTS

| | | | |
|---|---|---|---|
| 6,697,858 B1* | 2/2004 | Ezerzer et al. | 709/224 |
| 6,731,609 B1* | 5/2004 | Hirni et al. | 370/260 |
| 6,747,970 B1* | 6/2004 | Lamb et al. | 370/352 |
| 6,785,379 B1* | 8/2004 | Rogers et al. | 379/265.02 |
| 2002/0055364 A1 | 5/2002 | Wang et al. | |
| 2002/0071445 A1 | 6/2002 | Wu et al. | |
| 2002/0145990 A1 | 10/2002 | Sayeedi | |
| 2002/0147818 A1 | 10/2002 | Wengrovitz | |
| 2002/0172165 A1 | 11/2002 | Rosen et al. | |
| 2002/0172169 A1 | 11/2002 | Rosen et al. | |
| 2002/0173325 A1 | 11/2002 | Rosen et al. | |
| 2002/0173326 A1 | 11/2002 | Rosen et al. | |
| 2002/0173327 A1 | 11/2002 | Rosen et al. | |
| 2002/0177461 A1 | 11/2002 | Rosen et al. | |
| 2002/0191583 A1 | 12/2002 | Harris et al. | |
| 2003/0008657 A1 | 1/2003 | Rosen et al. | |
| 2003/0021264 A1 | 1/2003 | Zhakov et al. | |
| 2003/0114156 A1 | 6/2003 | Kinnavy | |
| 2003/0182374 A1 | 9/2003 | Haldar | |

FOREIGN PATENT DOCUMENTS

| | | |
|---|---|---|
| EP | 0 984 608 | 3/2000 |

OTHER PUBLICATIONS

International Search Report from International Application No. PCT/US02/29575, dated Dec. 10, 2002.

International Search Report from International Application No. PCT/US02/36055, dated Apr. 10, 2003.

International Search Report from International Application No. PCT/US03/03021, dated Jun. 18, 2003.

International Search Report from International Application No. PCT/US03/02950, dated Nov. 6, 2003.

Preliminary Examination Report from International Application No. PCT/US02/29575, dated Dec. 27, 2003.

3rd Generation Partnership Project 2 "3GPP2", Fast Call Set-Up, Version 1.0, Apr. 15, 2002.

Mobile Tornado, http://www.mobiletornado.com/products_iprsptt.html, printed from the World Wide Web on Jan. 27, 2003.

"Qualcomm Chats Up 'Push-to-Talk'," http://siliconvalley.internet.com/news/print.php/953261, printed from the World Wide Web on Jan. 27, 2003.

Schulzrinne and Rosenberg, "SIP Caller Preferences and Callee Capabilities," Internet Engineering Task Force, Internet Draft, Oct. 22, 1999.

Vakil et al., "Host Mobility Management Protocol Extending SIP to 3G-IP Networks," Internet Engineering Task Force, Internet Draft, Oct. 1999.

Campbell and Sparks, "Control of Service Context Using SIP Request—URI," Network Working Group, Apr. 2001.

Ericsson, www.telecomcorridor.com/wireless%20horizons/1Coyne.pdf, printed from the World Wide Web on Jun. 27, 2001.

Dirk Kutscher/Jorg Ott, "The Message Bus—A Communication & Integration Infrastructure for Component-Based Systems," White Paper, Jan. 2000.

Ott et al., "A Message Bus for Local Coordination," Network Working Group, Internet-Draft, May 30, 2001.

TR45, Medium Access Control (MAC) Standard for cdma2000 Spread Spectrum System, IS-2000-3, Jul. 12, 1999.

3rd Generation Partnership Project 2 '3GPP2', "Interoperability Specification (IOS) for CDMA 2000 Access Network Interfaces—Part 3 Features," Nov. 2001.

Perkins, "IP Mobility Support," Internet Engineering Task Force Request for Comment 2002, Oct. 1996.

Perkins, "IP Encapsulation within IP," Internet Engineering Task force Request for Comments 2003, Oct. 1996.

Perkins, "Minimal Encapsulation with in IP," Internet Engineering Task Force Request for Comments 2004, Oct. 1996.

Solomon, "Applicability Statement for IP Mobility Support," Internet Engineering Task Force Request for Comments 2005, Oct. 1996.

Handley et al., "SDP: Session Description Protocol," Internet Engineering Task Force Request for Comment 2327, Apr. 1998.

Handley et al., "SIP: Session Initiation Protocol," Internet Engineering Task Force Request for Comment 2543, Mar. 1999.

Fielding et al., "Hypertext Transfer Protocol—HTTP/1.1," Internet Engineering Task force Request for Comment 2616, Jun. 1999.

Righey et al., "Remote Authentication Dial in User Service (RADIUS)," Internet Engineering Task Force Request for Comment 2865, Jun. 2000.

Rigney, "RADIUS Accounting," Internet Engineering Task Force Request for Comment 2866, Jun. 2000.

OMA, Discussion and definitions on PoC Floor Control, Input Contribution, Doc #OMA-REQ-2003-0375-PoC_Floor_Control, Jun. 2, 2003.

OMA, "PoC Use case: Mobile—PC Example," Input Contribution, Doc #OMA-REQ-2003-0323 PoC Mobile-PC use case, May 5, 2003.

OMA, "PoC Use case: Multimedia Group Call Example," Input Contribution, Doc #OMA-REQ-2003-0306-PoC Use Case-group-multimedia-scenario, May 6, 2003.

OMA, "PoC Use case: Examples of User Requirements," Input Contribution, Doc #OMA-REQ-2003-0305-PoC Use Case, May 6, 2003.

OMA, "Inputs for PoC Requirements Document," Input Contribution, Doc #OMA-REQ-2003-0367-PoC_Input_Motorola, May 29, 2003.

OMA, "Push to Talk over Cellular (PoC)," Version: 0.1.6, May 12, 2003.

Handley et al., "SDP: Session Description Protocol", RFC: 2327, Apr. 1998, pp. 1-42.

* cited by examiner

SYSTEM AND METHOD FOR SIDEBAR FUNCTIONALITY IN A REGULAR CONFERENCE SYSTEM

FIELD OF THE INVENTION

This present invention relates to conference systems. More specifically, it relates system and methods for providing sidebar conferences.

BACKGROUND OF THE INVENTION

Conferencing systems allow users to conduct multimedia conferences from multiple locations. A conference may allow users located in one or more cities to meet as if all the users were in the same physical location. The conference may be a video/audio conference or any form of multimedia conference.

Conferencing systems may offer a number of features for the benefit of users. For example, muting may be used to allow some of the participants to engage in other activities during the conference. In another example, record and rewind features may allow the conference to be recorded and may allow a recorded conference to be replayed for conference participants and others.

Each of the users of a conference may produce an audio stream. The audio stream may include the audible comments of the user. A sidebar feature may be used that allows two or more parties within an ongoing conference to create a separate media path that their audio streams are only available to themselves, but not the rest of the conference members. In this situation, the audio stream of the ongoing conference may be still audible to the sidebar members. The sidebar feature may be used for inter-party comments, explanations, and secrets during the conference so as not to disturb the rest of the conference parties.

Various protocols may be used to allow a conference to be set-up and conducted. For example, the Session Description Protocol (SDP) may be used to communicate information between servers and users in order to set-up a conference. The SDP specifies the format of messages allowing the set-up of the conference. One example of the SDP is described in RFC 2327 promulgated by the Internet Engineering Task Force (IETF).

SUMMARY OF THE INVENTION

The method and system of the present invention advantageously allows a group of users conducting an on-going conference to hold a sidebar conference. Specifically, a temporary conference may be established that includes the audio stream of the conference and the audio streams of each of the selected group of users. The audio streams of each of the selected group of users are only audible to the selected group of users of the sidebar conference and not other original conference participants.

In one example of the present invention, a first user and a second user may have audio streams. An on-going conference, which includes the first user and the second user, may also have an audio stream. A temporary conference may be created. The audio stream of the on-going conference may be directed to the sidebar conference. The audio stream of the first user may be directed to the temporary conference and the audio stream of the second user may be directed to the temporary conference. The audio stream of first user and the audio stream of the second user may be only audible to the first user and the second user.

In another example of the present invention, a system for conducting a sidebar conference within an on-going conference includes a network, a first user, a second user, a conference server, and an interactive voice recognition (IVR) server. The on-going conference, the first user and the second user have audio streams.

The IVR server may receive commands from the first user causing the IVR server to prompt the conference server to establish a temporary conference. The conference server may maintains the conference and establishes the temporary conference at the request of the IVR server. The temporary conference may include only the first and second user, the temporary conference including the audio stream of the conference and the audio stream of the first user and the audio stream of the second user.

The foregoing and other features and advantages of the system and method for conferencing will be apparent from the following more particular description of preferred embodiments of the system and method as illustrated in the accompanying drawings in which like reference characters refer to the same parts throughout the different views.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Figure 1:
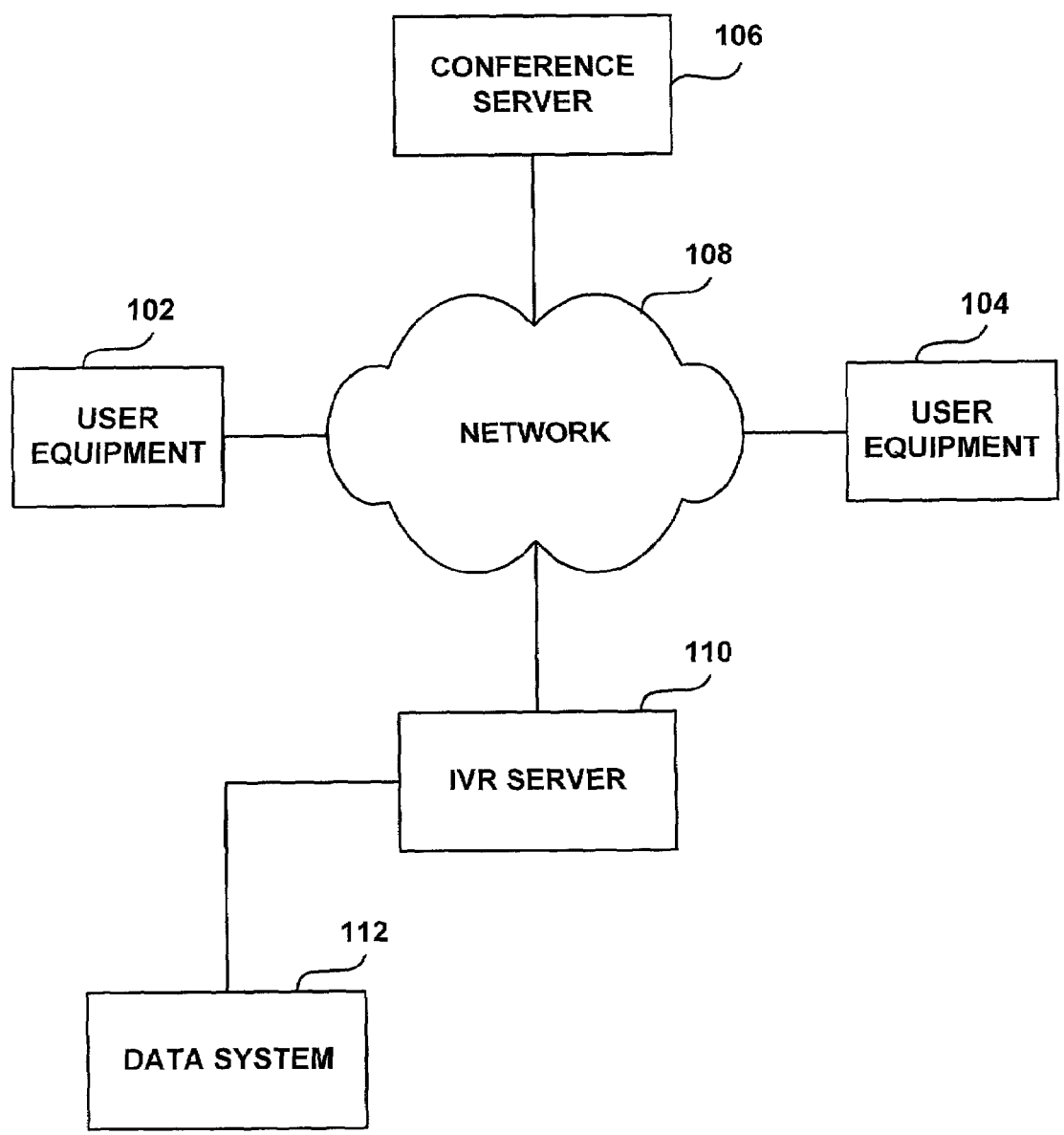
FIG. 1 is a diagram illustrating a preferred embodiment of the system for sidebar conferencing in accordance with the present invention.

Referring now to FIG. 1, an example of a system for sidebar conferencing is described. The system includes a first user equipment 102, a second user equipment 104, a conference server 106, a network 108, an interactive voice recognition (IVR) server 110, and a data system 112.

The first user equipment 102, conference server 106, second user equipment 104, and IVR server 110 are coupled to the network 108. The IVR server 110 is coupled to a data system 112.

The first user equipment 102 and second user equipment 104 may be any type of equipment that can transmit any type of information to a network and receive any type of information from a network. For example, the first user equipment 102 and second user equipment 104 may be personal computers or personal digital assistants. Other examples of user equipment are possible. The user equipments 102 and 104 may include the functionality to interface with any type of network or networks. In addition, the user equipments 102 and 104 may be assigned an address.

The network 108 may be any type of network or any combination of networks. For example, the network 108 may be any combination of wireless, IP, or telephone network. The network 108 may route information between the different entities coupled to the network 108. For example, the network 108 may route information between the first user equipment 102 and the second user equipment 104.

The functions of the conference server 106 may be implemented using computer instructions stored in a memory and executed by a processor. For example, the conference server 106 may create and maintain multiple conference sessions, mix multiple audio streams for each conference, and dispatch mixed audio stream to each conference user. Other functions are possible.

The functions of the IVR server 110 may be implemented using computer instructions stored in memory and executed by a processor. For example, the IVR server 110 may obtain user passwords, obtain other identification from users, store voice greetings, and process commands from the users.

The IVR server 110 may also provide a menu to the user. The menu may allow the user to indicate parties that the user desires to conduct a sidebar conference. The user may select the other users from a list, type in the other users, or speak the name of the other users. Other examples of data entry techniques are also possible. The IVR server 110 may then decode the commands, determine the other users, query the other users, receive replies concerning the query from the other users, and determine from these replies whether the other users desire to enter the sidebar conference. It will also be understood that the above-mentioned functions may be moved to any other entity in the system. In other words, sidebar functionality mentioned in conjunction with the IVR server 110 are in no way limited into being present only on the IVR server 110.

The data system 112 may be any type of system that provides data processing capabilities. For example, the data system 112 may be a bank accounting system or brokerage accounting system. Other examples are possible. The data system may process commands received from the IVR server 110. The commands may be received in any format.

Figure 2:
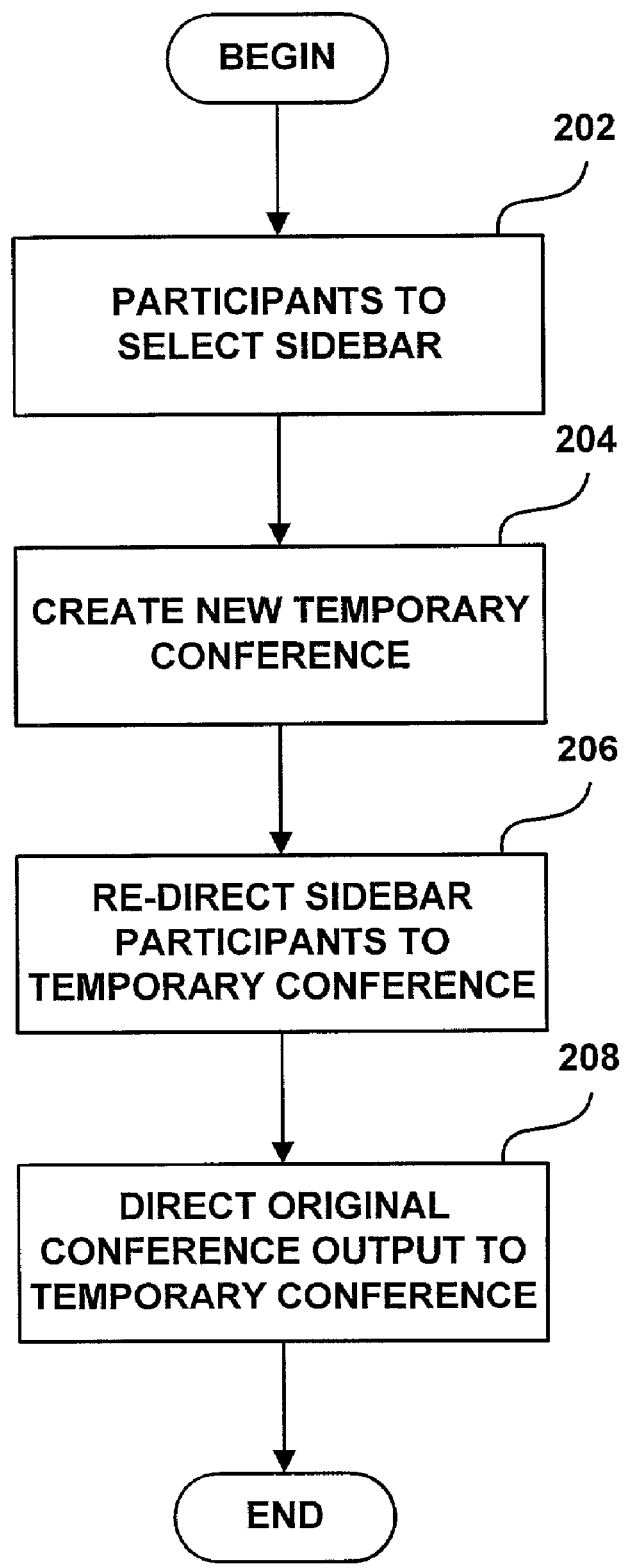
FIG. 2 is a flowchart illustrating one example of sidebar conferencing in accordance with a preferred embodiment of the present invention.

Referring now to FIG. 2, one example of the operation of the sidebar conferencing for two participants is described.

At step 202, selected users decide they want to hold a sidebar conference during an on-going conference. A user may enter a command or perform some action that requests that the system to conduct a sidebar conference. In one example, a menu may be presented to a first user and the first user may select a second user to be in a sidebar conference from the menu. The system may then query the second user and determine that the second user desires to join the sidebar conference. Inviting more users into the sidebar conference is also possible.

At step 204, a new temporary conference may be created. The conference may be created by assigning a new conference identifier to the temporary conference and conducting signaling operations that set-up the conference.

At step 206, the system redirects the sidebar participants into the temporary conference so that the audio inputs of the sidebar participants are only available to the participants of the temporary conference. At step 208, the system directs the original conference output to the temporary conference as a standalone audio input. This audio input is identified as a talk-only party. In other words, the sidebar participants are allowed to hear the original conference through this input, but any party not in the sidebar cannot hear the sidebar since these other parties are now in a different conference session.

Figure 3:
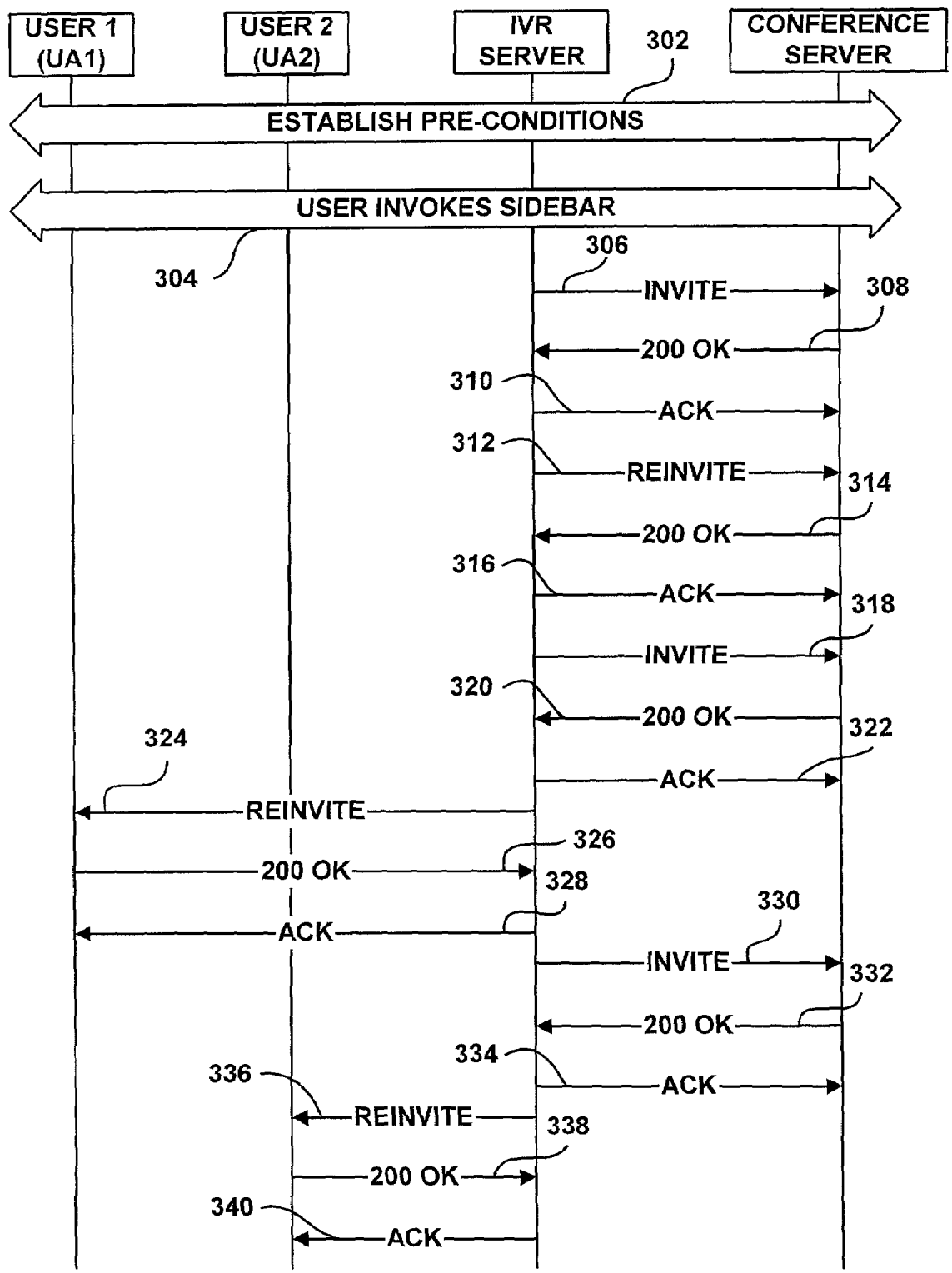
FIG. 3 is a call flow diagram illustrating sidebar conferencing in accordance with a preferred embodiment of the present invention.

Referring now to FIG. 3, another example of the operation of sidebar conferencing is described. This method may use signaling messages that follow the SIP and SDP protocols. However, it will be understood that any number of different protocols and signaling methods may be used and the system and method described herein is not limited to commands following these protocols.

At step 302, preconditions for the conference are established. For example, a user 1 (at network address UA1) and a user 2 (at network address UA2) may have established a conference. The conference may also have a number of different parameters. For example, the conference URI may be "ConfIDx@conference.com." The conference server SDP may be "SDP_ConfIDx."

At step 304, user 1 invokes the sidebar with user 2. For example, user 1 may invoke a IVR menu during the conference. The IVR server may prompt the user 1 for the parties user 1 wishes to conduct a sidebar conference. User 1 may select user 2 by various methods. For instance, user 1 may select user 2 from a list. In another example, voice recognition techniques could be used by user 1 to select user 2. User 2 may also accept the request of the sidebar before the sidebar is initiated.

At step 306, an INVITE message is sent from the IVR server to the conference server. The INVITE message includes a URI of "ConfIDxSB1@conference.com" and a SDP of SDP_ConfIDx with a set equal to "send only." The effect of this message is to tell the conference server to set up a sidebar conference with these parameters and prepare to receive the original conference audio stream as a talk only participant in the new conference.

At step 308, a 200 OK message is sent from the conference server to the IVR server. The 200 OK message includes an SDP of SDP_ConfIDxSB1. The effect of this message is to inform the IVR server that a temporary conference has been set-up with a SDP of SDP_ConfIDxSB1.

At step 310, an acknowledgement message is sent from the IVR server to the conference server. The purpose of the acknowledgement message is for the IVR server to acknowledge receipt of the 200 OK message.

At step 312, a RE-INVITE message is sent from the IVR server to the conference server. The RE-INVITE message includes a call leg of n+1, and an SDP of SDP_ConfIDxSB1 with a equal to "receive only." The effect of this message is to redirect the original conference audio stream into the sidebar conference and to inform the sidebar conference to receive only.

At step 314, a 200 OK message is sent from the conference server to the IVR server. The 200 OK message includes an SDP of SDP ConfIDxSB1.

At step 316, an acknowledgement message is sent from the IVR server to the conference server. The purpose of the acknowledgement message is for the IVR server to acknowledge receipt of the 200 OK message.

At step 318, an INVITE message is sent from the IVR server to the conference server. The INVITE message includes a URI of "ConfIDxSB1@conference.com" and a SDP of SDP_User1. The effect of this message is to inform the conference server to create a sidebar conference path with user 1.

At step 320, a 200 OK message is sent from the conference server to the IVR server. The 200 OK message includes and SDP of SDP_ConfIDxSB1. The effect of the message is to inform the IVR server that such a path has been created for user 1.

At step 322, an acknowledgement message is sent from the IVR server to the conference server. The purpose of the acknowledgement message is for the IVR server to acknowledge receipt of the 200 OK message.

At step 324, an RE-INVITE message is sent from the IVR server to user 1. The REINVITE message includes a call leg of n, and an SDP of SDP_ConfIDxSB1. The effect of this message is to redirect the user 1 into the sidebar conference from the original conference.

At step 326, a 200 OK message is sent from user1 to the IVR server. The 200 OK message includes as SDP of SDP_User1. The effect of this message is to inform the IVR server that user 1 has been redirected to the sidebar conference.

At step 328, an acknowledgement message is sent from the IVR server to user1. The purpose of the acknowledgement message is for the IVR server to acknowledge receipt of the 200 OK message.

At step 330, an INVITE message is sent from the IVR server to the conference server. The INVITE message includes a URI of "ConfIDxSB1@conference.com" and a SDP of SDP_User2. The effect of this message to inform the conference server to create a sidebar conference path with user 2.

At step 332, a 200 OK message is sent from the conference server to the IVR server. The 200 OK message includes an SDP of SDP_ConfIDxSB1. The effect of this message is to inform the IVR server that such a path has been created for user 2.

At step 334, an acknowledgement message is sent from the IVR server to the conference server. The purpose of the acknowledgement message is for the IVR server to acknowledge receipt of the 200 OK message.

At step 336, a RE-INVITE message is sent from the IVR server to the user 1. The RE-INVITE message includes a call leg of m, and an SDP of SDP_ConfIDxSB1. The effect of this message is to redirect the user 2 into the sidebar conference form the original conference.

At step 338, a 200 OK message is sent from the conference server to the IVR server. The 200 OK message includes a SDP of SDP_User2.

At step 340, an acknowledgement message is sent from the IVR server to the user 1. The purpose of the acknowledgement message is for the IVR server to acknowledge receipt of the 200 OK message.

Figure 4:
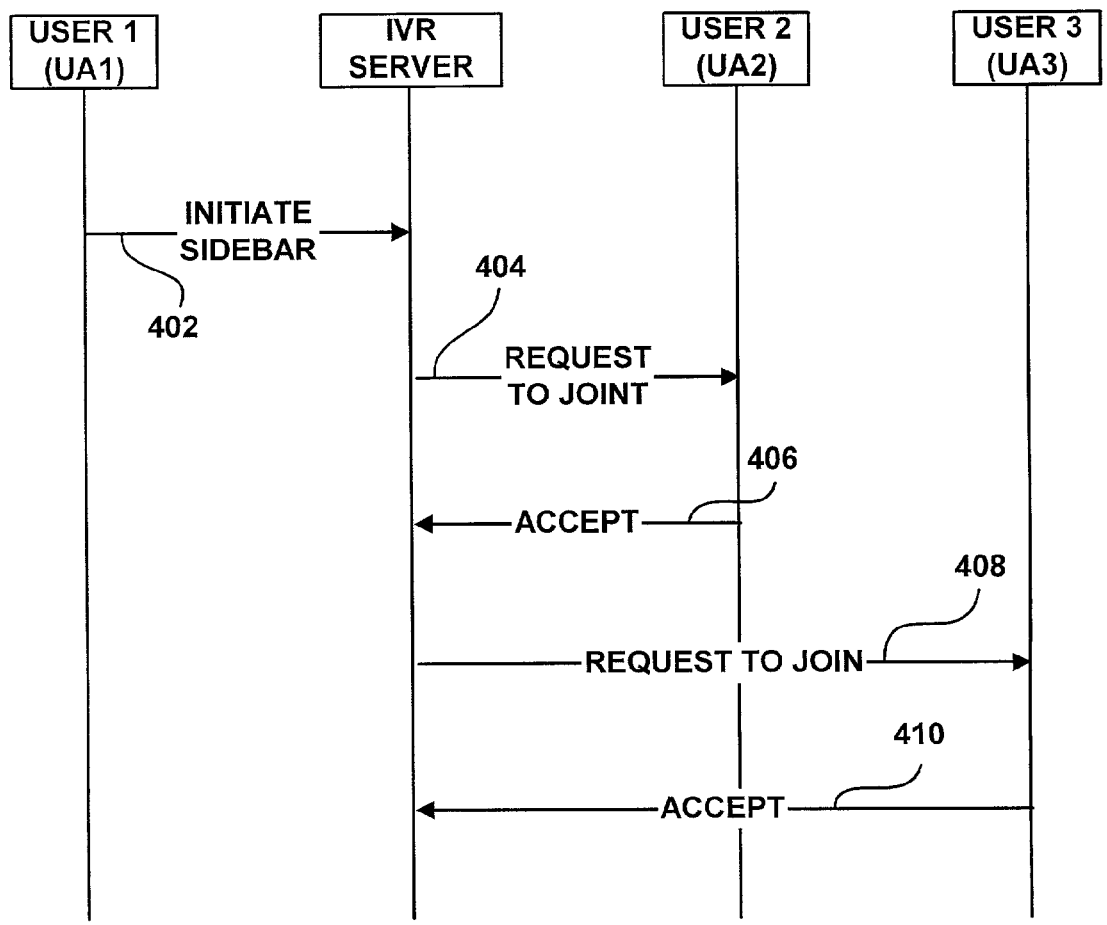
FIG. 4 is a call flow diagram illustrating the initiation of a sidebar conference in accordance with a preferred embodiment of the present invention.

Referring now to FIG. 4, one example of a process to initiate a sidebar conference is described. At step 402, a first user sends an Initiate Sidebar Request to the IVR server. For example, this request may be in the form of an IVR menu selection. This request may be formed by the first user when the user selects participants it desires to include in the sidebar conference. In this example, the first user requests that the IVR server establish a sidebar with a second user and a third user.

At step 404, the IVR server sends a Request-to-Join message to the second user. For example, the message may be in the form of an INVITE message. At step 406, the second user sends an acceptance message to the IVR server. For example, the acceptance message may be in the form of a 200 OK message. The acceptance message indicates that the second user desires to join in the sidebar. Conversely, the second user may send a rejection message to the IVR server at step 406 if the second user does not wish to join the sidebar.

At step 408, the IVR server sends a Request-to-Join message to the third user. For example, the message may be in the form of an INVITE message. At step 410, the third user sends an acceptance message to the IVR server. For example, the acceptance message may be in the form of a 200 OK message. The acceptance message indicates that the third user desires to join in the sidebar. Conversely, the third user may send a rejection message to the IVR server at step 406 if the third user does not wish to join the sidebar conference.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for conducting a sidebar conference may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method of sidebar conferencing, the method comprising:

establishing a call conference between a first user, the first user having an audio stream, and a second user, the second user having an audio stream, the call conference having an audio stream;

creating a temporary call conference by transmitting a SIP INVITE message to a call conference server requesting a temporary call conference, wherein the SIP INVITE message indicates that the audio from the call conference should be a talk only participant in the temporary call conference;

directing the audio stream of the call conference to the temporary call conference by transmitting a first SIP RE-INVITE message to the call conference server indicating that the server should receive audio from the call conference; and directing the audio stream of the first user to the temporary call conference and directing the audio stream of the second user to the temporary call conference by transmitting second and third SIP RE-INVITE messages to the first and second user, respectively, wherein the audio stream of the first user and the audio stream of the second user are only audible to the first user and the second user.

2. The method of claim 1 further comprising prompting the first user for information indicating the identity of the second user.

3. The method of claim 2 wherein prompting the user includes presenting a menu to the user.

4. The method of claim 2 further comprising receiving and processing voice commands from the first user.

5. The method of claim 1 further comprising determining whether the second user desires to enter the sidebar with the first user.

6. A device for conducting a sidebar conference between a first user and a second user, the device comprising:
  means for establishing a call conference between a first user, the first user having an audio stream, and a second user, the second user having an audio stream, the call conference having an audio stream;
  means for creating a temporary call conference by transmitting a SIP INVITE message to a call conference server requesting a temporary call conference, wherein the SIP INVITE message indicates that the audio from the call conference should be a talk only participant in the temporary call conference;
  means for directing the audio stream of the conference to the temporary call conference by transmitting a first SIP RE-INVITE message to the call conference server indicating that the server should receive audio from the call conference; and
  means for directing the audio stream of the first user to the temporary conference and directing the audio stream of the second user to the temporary conference by transmitting second and third SIP RE-INVITE messages to the first and second user, respectively, wherein the audio stream of the first user and the audio stream of the second user are only audible to the first user and the second user.

7. The system of claim 6 further comprising means for prompting the first user for information indicating the identity of the second user.

8. The method of claim 7 wherein the means for prompting the user includes means for presenting a menu to the user.

9. The method of claim 7 further comprising means for receiving and processing voice commands from the first user.

10. The method of claim 6 further comprising means for determining whether the second user desires to enter the sidebar with the first user.

11. A method for establishing a sidebar conference between a first user and a second user, within a on-going conference, the on-going conference having an audio stream, the first user having an audio stream, the second user having an audio stream, the method comprising the steps of:
  directing the audio stream of the conference to a temporary conference by transmitting a first SIP RE-INVITE message to the call conference server indicating that the server should receive audio from the call conference; and
  directing the audio stream of the first user to the temporary conference and directing the audio of the second user to the temporary conference by transmitting second and third SIP RE-INVITE messages to the first and second user, respectively, wherein the audio stream of the first user and the audio stream of the second user are only audible to the first user and the second user.

12. A computer program for establishing a sidebar conference, the program comprising:
  first code for establishing a conference between a first user, the first user having an audio stream, and a second user, the second user having an audio stream, the conference having an audio stream;
  second code for creating a temporary conference by generating a SIP INVITE message to a call conference server requesting a temporary call conference, wherein the SIP INVITE message indicates that the audio from the call conference should be a talk only participant in the temporary call conference;
  third code for directing the audio stream of the conference to the temporary conference by transmitting a first SIP RE-INVITE message to the call conference server indicating that the server should receive audio from the call conference; and
  fourth code for directing the audio stream of the first user to the temporary conference and directing the audio stream of the second user to the temporary conference by transmitting second and third SIP RE-INVITE messages to the first and second user, respectively wherein the audio stream of first user and the audio stream of the second user are only audible to the first user and the second user.

13. A computer readable medium having stored therein instructions for causing a processing unit to execute the following method:
  establishing a conference between a first user, the first user having an audio stream, and a second user, the second user having an audio stream, the conference having an audio stream;
  creating a temporary conference by generating a SIP INVITE message to a call conference server requesting a temporary call conference, wherein the SIP INVITE message indicates that the audio from the call conference should be a talk only participant in the temporary call conference;
  directing the audio stream of the conference to the temporary conference by transmitting a first SIP RE-INVITE message to the call conference server indicating flat the server should receive audio from the call conference; and
  directing the audio stream of the first user to the temporary conference and directing the audio stream of the second user to the temporary conference by transmitting second and third SIP RE-INVITE messages to the first and second user, respectively, wherein the audio stream of first user and the audio stream of the second user are only audible to the first user and the second user.

* * * * *